Sept. 10, 1968        R. SMITH        3,400,532
APPARATUS FOR MAKING HORSESHOES
Filed Oct. 22, 1965        5 Sheets-Sheet 1
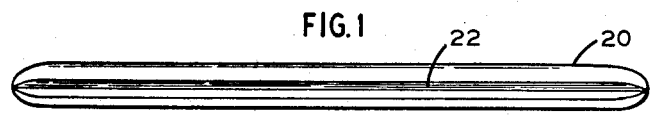
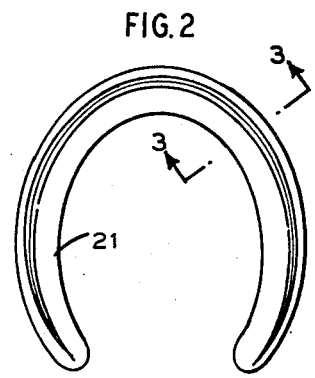
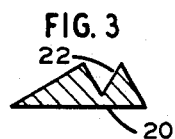
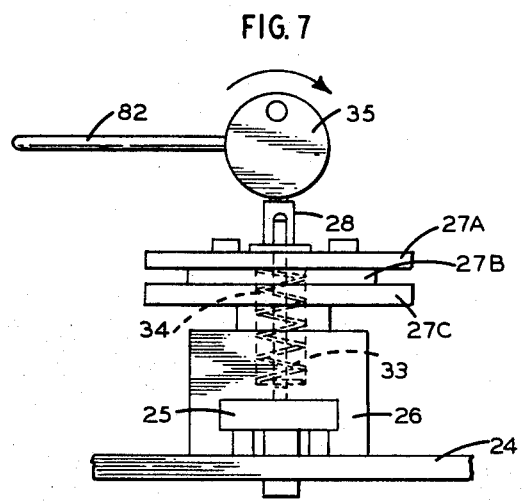
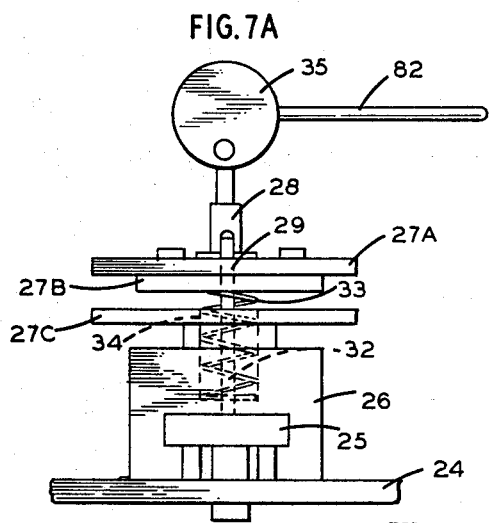
INVENTOR.
Raymond Smith
BY
ATTORNEY

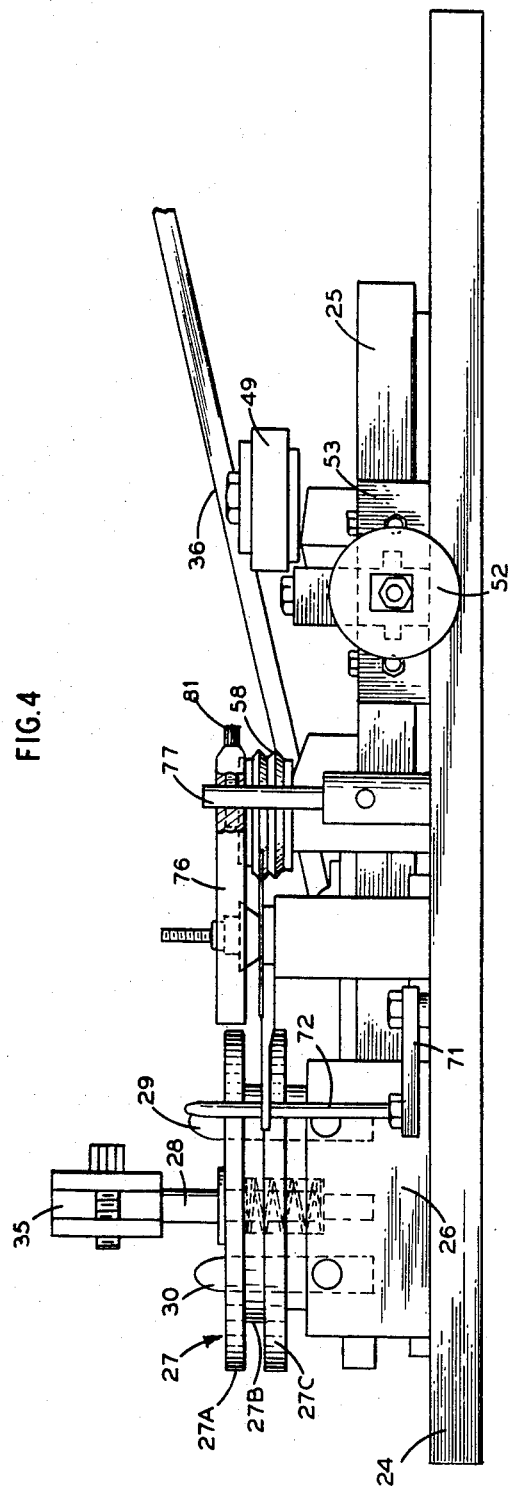

Sept. 10, 1968  R. SMITH  3,400,532
APPARATUS FOR MAKING HORSESHOES
Filed Oct. 22, 1965  5 Sheets-Sheet 3

Sept. 10, 1968 R. SMITH 3,400,532
APPARATUS FOR MAKING HORSESHOES
Filed Oct. 22, 1965 5 Sheets-Sheet 4

Sept. 10, 1968 R. SMITH 3,400,532
APPARATUS FOR MAKING HORSESHOES
Filed Oct. 22, 1965 5 Sheets-Sheet 5

United States Patent Office 3,400,532
Patented Sept. 10, 1968

3,400,532
APPARATUS FOR MAKING HORSESHOES
Raymond Smith, 2322 Neptune Ave.,
Seaford, N.Y. 11783
Filed Oct. 22, 1965, Ser. No. 501,332
9 Claims. (Cl. 59—36)

ABSTRACT OF THE DISCLOSURE

This disclosure is directed to an apparatus for shaping bar stock into horseshoes. The apparatus comprises essentially a base member on which there is mounted a track on which a die for shaping the bar stock into horseshoes is mounted. A drive means is connected to the die to move it along the track. Forming means are disposed on either side of the track to bend the stock to the shape of the die as the latter is advanced along the track. The arrangement is such that the bar stock is automatically centered before the die is moved.

---

This invention relates in general to an apparatus for making horseshoes, and more specifically, to an apparatus for shaping bar stock of predetermined lengths into horseshoes.

Horseshoes have been for years formed by blacksmiths using age old methods of forging and then bending bar stock into horseshoes by hand. As a result, it took a blacksmith, with years of experience, over five minutes to bend a horseshoe from straight bar stock. For a blacksmith with less experience, it took considerably longer. Also, horseshoes formed by blacksmiths manually are not perfectly uniform, since each horseshoe would vary in accordance with the hammering necessitated by the blacksmith in forming the same. Consequently, the manual method of forming horseshoes was relatively tedious, time consuming and expensive.

It is therefore an object of this invention to provide an apparatus which is capable of forming bar stock of predetermined lengths into horseshoes of any given size in a relatively simple and expedient manner.

Another object of this invention is to provide an apparatus for forming horseshoes out of bar stock of predetermined lengths which for any given size are perfectly uniform in all respects.

Still another object of this invention is to provide an apparatus capable of forming horseshoes in a manner of seconds.

Another object of this invention is to provide an apparatus in which the bar stock is automatically centered and aligned for the shoe forming operation.

Another object of this invention is to provide an apparatus which is rendered readily adjustable to form any shoe size within a given range of sizes.

Another object of this invention is to provide a horseshoe bending apparatus which is rendered readily adjusted to accommodate various size bar stocks.

In accordance with this invention, the foregoing objects and other features and advantages are attained by an apparatus comprised essentially of a base member on which there is mounted a track means. A die means about which the bar stock is formed is mounted for movement along the track means, and a drive means is operatively connected to the die means for advancing the same along the track means during a shoe forming operation. Forming means are mounted on either side of the track means to bend the bar stock about said die means to shape the same accordingly as the die means moves along the track. Means are also provided for automatically aligning and centering the bar stock relative to the die means prior to movement of the die means along the track means.

In accordance with this invention the die means is specifically constructed to render it interchangeable to render the apparatus adapted for forming horseshoes of various sizes within a given range size. Also the die means is constructed and arranged to facilitate and expedite the positioning of the bar stock relative thereto, and for effecting removal of the horseshoe formed therefrom upon completion of the shoe forming operation.

The centering and aligning means are operatively arranged on the base member so as to automatically effect the aligning and centering of the bar stock with respect to the die means in preparation of the forming operation. Essentially, the centering and aligning means comprises an aligning means disposed on either side of the die means, each of which are rendered operative to position the bar stock substantially normal to the direction of movement of the die means. Cooperatively associated with the aligning means is a centering means on either side of the track which will automatically engage the ends of the bar stock to center it relative to the die means in preparation to moving the same along the track to effect the forming operation. The centering means may be adjusted to effect a discentering position of the bar stock if one side of the shoe is desired to be made longer than the other side.

A feature of this invention resides in the provision of a horseshoe bending apparatus having a die means constructed and arranged to accommodate various size bar stocks and to form horseshoes of various sizes within a given range of sizes.

Another feature of this invention resides in a particular die construction arranged to facilitate the removal of the formed horseshoe therefrom upon the completion of a forming operation.

Another feature of this invention resides in the provision of an aligning means constructed and arranged to effect automatic alignment of the bar stock substantially normal to the direction of the die prior to the forming operation.

Another feature of this invention resides in the provision of an adjustable centering means which will center or predeterminely position the bar stock relative to the die prior to the forming operation.

Another feature of this invention resides in a horseshoe bending apparatus that is relatively simple in construction, can be inexpensively fabricated, and which is positive in operation.

Other features and advantages will become more readily apparent when considered in view of the drawings and specification in which, FIGURE 1 illustrates a plan view of a bar of stock from which a horseshoe is formed.

FIGURE 2 illustrates a plan view of a horseshoe formed from the bar stock of FIG. 1.

FIGURE 3 illustrates a cross sectional view taken along line 3—3 on FIG. 2.

FIGURE 4 is a side elevation view of the horseshoe bending apparatus of the instant invention illustrating only that portion of the apparatus located above the base plate.

FIGURE 7 is a detail front elevation view of the die means of the horseshoe apparatus of FIG. 4, illustrated in its clamped or operative position.

FIGURE 7A is a view similar to that of FIG. 7 but illustrating the die means in the open or inoperative position.

Figure 6:
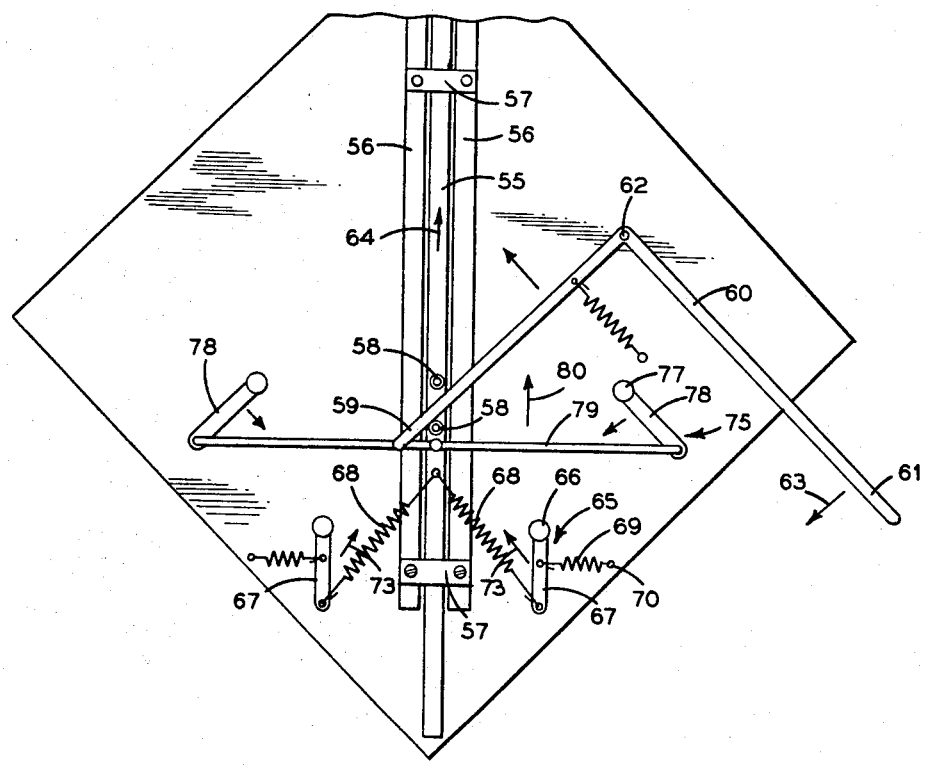
FIGURE 6 is a bottom view of the apparatus of FIG. 5.

Referring to FIGS. 1, 2 and 3, there is shown therein a typical bar of stock material 20 from which a horseshoe 21, as illustrated in FIG 3, is formed. The illustrated bar stock 20 comprises a pre-formed bar of suitable iron or other suitable metallic material of a predetermined length sufficient to form a horseshoe 12 of given size. One surface of the bar stock is provided with a longitudinal V notch 22 to define a pair of edges to form a cleat for enabling a horse wearing such shoe to attain more traction. However, the cross section of the bar 20 may assume any desired configuration.

Figure 5:
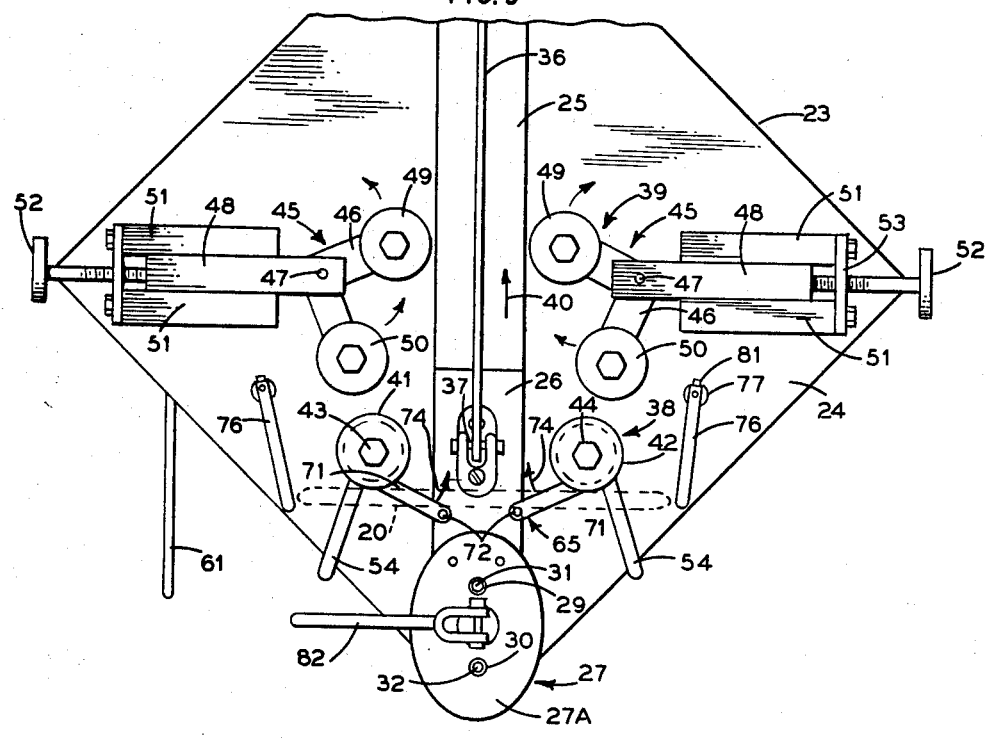
FIGURE 5 is a fragmentary plan view of the apparatus of FIG. 4.

In accordance with this invention, the bar stock 20 of FIG. 1 is formed into a horseshoe 21 of FIG. 3 by an apparatus 23 to be herein described. Referring to FIGS. 4 and 5, the apparatus 23 by which the bar stock 20 of FIG. 1 is expediently formed into a horseshoe of predetermined size comprises a base member 24 in the form of a relatively rigid platform, which as seen in FIG. 5, is substantially rectangular in shape. A track 25 is connected to the upper surface of the base member and it extends along the diagonal centerline thereof. Mounted for longitudinal movement along the track 25 is a carriage 26 on which there is mounted the die means 27 about which the length of bar stock is shaped to define a horseshoe.

In accordance with this invention, the die means 27 comprises a series of plate members 27A, 27B, 27C which are sandwiched together and which are adapted to clamp and unclamp between an operative and inoperative position. As best seen in FIGS. 7 and 7A, the die forming means 27 comprises a series of superimposed plate members 27A, B, C. As shown, the upper and lower plates or members 27A, 27C are substantially elliptical in form, and each is provided with aligned openings to receive a vertical spindle or shaft 28 carried on the carriage 26. The size of the respective die plates 27A and 27C are dependent on the size of a horseshoe to be formed. Sandwiched between the upper and lower die plates is the horseshoe die plate 27B. Accordingly, the horseshoe die plate 27B is sized to define the particular horseshoe size to be formed. In the illustrated form of the invention, it is to be noted that the upper and lower plates 27A, 27C are larger than the center die plate 27B disposed therebetween.

In accordance with this invention, it is to be noted that each of the plates of the die is provided with aligned apertures 29, 30 adapted to receive driven pins 31, 32 connected to the carriage 26. Accordingly, the drive pins 31, 32 comprise the means that transmit the driving force of the carriage 26 to the plate members of the die means 27.

In accordance with this invention, and as best seen in FIGS. 7, 7A, a coil compression spring 33 is interposed about the shaft 28 and it extends upwardly through an opening 34 formed in the bottom die member 27C. In the illustrated form of the invention, the die forming plate 27B is detachably connected to the upper plate 27A and accordingly is constructed and arranged so as to be rendered movable therewith between operative and inoperative position. Accordingly, the upper end of the compression spring 32 is normally urged against the upper plate 27A so as to exert a bias or force on the plate 27A tending to urge it and the connected die plate away from the bottom plate 27C. An eccentric cam 35 is rotatably journalled to the upper end spindle whereby rotation of the eccentric in one direction, as seen in FIG. 7, urges the top plate and connected die plate 27B against the bias of the compression spring 34 to overcome the force thereof and maintains the respective upper and lower plate members 27A, 27C in the closed or clamped operative position. The positioning of the eccentric 35 to the other extreme, as seen in FIG. 7A will release the force of the spring 34 acting on the upper plate thereby permitting the upper plate to move away from the lower plate to unclamp or open the die. Accordingly, in the open position, a finished form horseshoe can be readily removed from the die means 27 as will be hereinafter noted. Also, by rendering the intermediate or die forming plate 27B detachably secured to the upper plate 27A, it will be noted that die plates 27A, 27B, 27C of various horseshoe sizes can render interchangeable in the die means and thereby render the apparatus adaptable for forming shoes of varying sizes.

A suitable drive rod 36 is connected to the carriage 26 by means of a pivotable connection 37 to effect movement of the carriage and connected die means 27 longitudinally of the track 25. It will be understood that any suitable form of power means, as for example, a motor and gear arrangement, or a pneumatic or hydraulic piston and cylinder assembly is operatively connected to the drive rod 36 to effect movement of the carriage and die means along the track.

Figure 10:
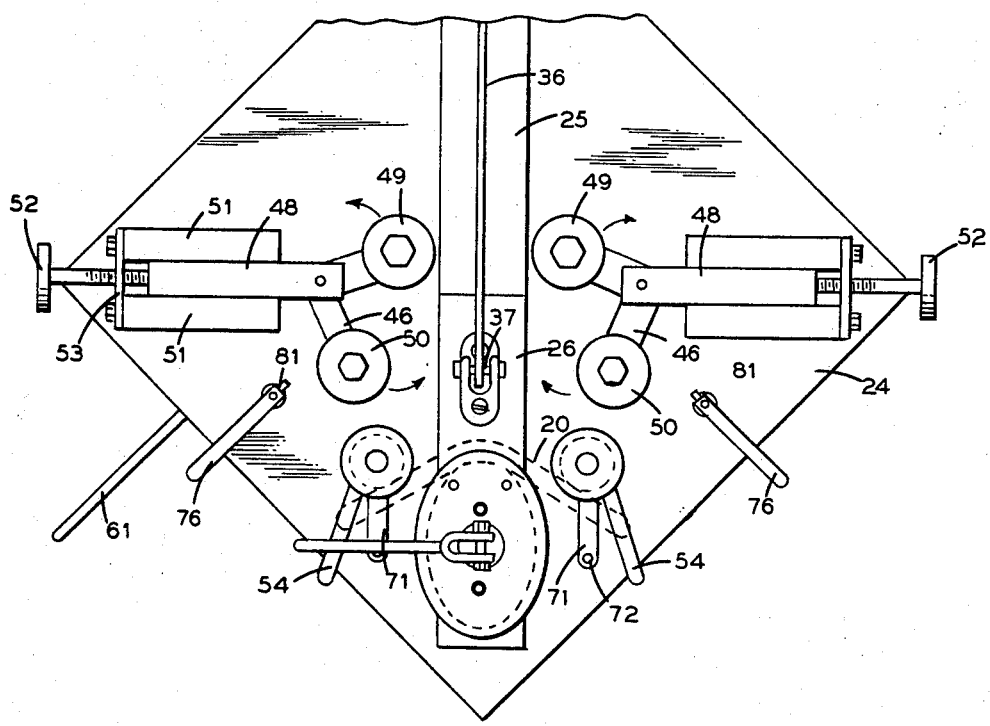
FIGURE 10 illustrates a plan view of the horseshoe bending apparatus of FIG. 4 with the parts thereof shown in position for initiating the bend of the bar stock.

Referring to FIG. 5, it will be noted that forming means or stations 38, 39 are mounted on the base member with the components thereof on either side of the track means to engage the bar stock and form the same about the die means to shape the same accordingly as the die means is moved longitudinally along the track in the direction indicated by arrow 40. As shown, the first forming means or station 38 comprises a pair of rollers 41, 42 which are fixed to the base member and rendered rotatably journalled about their pivots 43 and 44 disposed on either side of the track. Accordingly, it will be noted that the distance between fixed rollers 41, 42 as best seen in FIGS. 10 and 11, is sufficient to permit the die means 27 to pass therebetween with spacing to accommodate the bar size.

Figure 11:
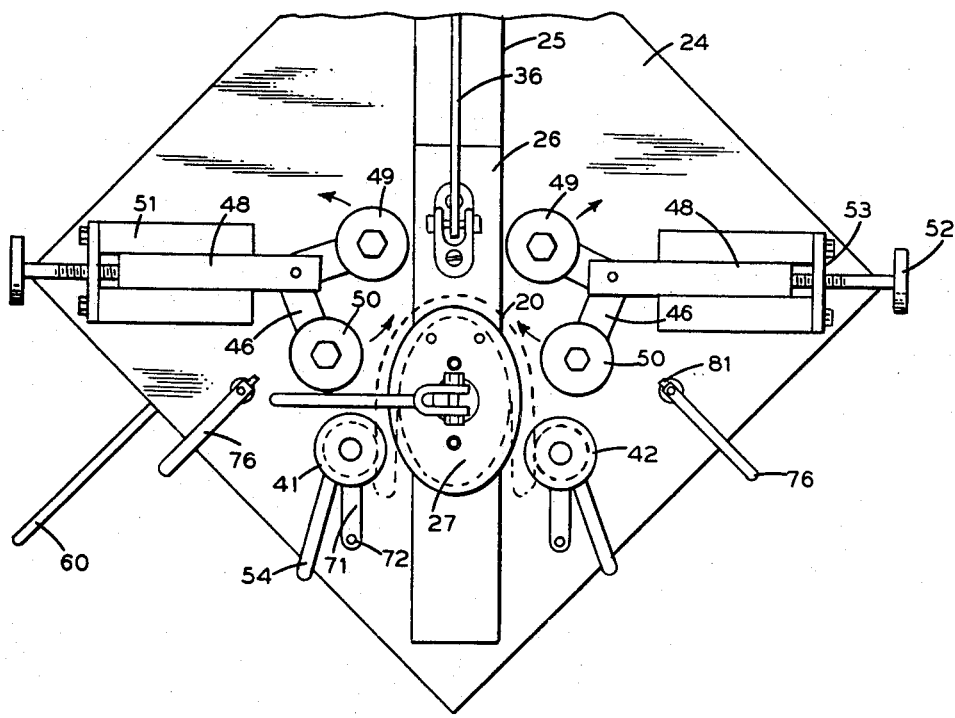
FIGURE 11 is a view similar to that of FIG. 10 but illustrating the relative position of the parts at an intermediate portion of the shoe forming operation.

Accordingly, the spacing is sufficient to accommodate the minor diameter of the die means 27 plus the width of the bar stock as best seen in FIG. 11. With the bar stock disposed normal to the direction of movement of the die means 27, it will be noted that movement of the die means 27 between the fixed rollers 41, 42 causes the bar stock engaging the same to be angularly bent, as noted in FIGS. 10 and 11, as the die forming means 27 is moved longitudinally of the track. Accordingly, the position of the fixed rollers 41, 42 initiates the form of the toe portion of the shoe.

Mounted downstream from the fixed pair of rollers 41, 42 is a second forming means 39 to complete the bending operation. As shown, the second forming means 39 comprises a pair of units 45, 45 which are similar in construction, with each disposed on either side of the track. As shown, each unit 45, 45 of the second forming means 39 comprises a bell crank 46 which is pivotally mounted at the bend thereof at 47 on a laterally disposed adjusting bar 48. Accordingly, a forming roller 49, 50 is rotatably connected to each end of the bell crank lever 46.

As shown, the adjusting bar 48 is disposed between a pair of guide members 51 and is rendered laterally adjusted through the means of an adjusting screw 52 which is threaded through a cross member 53 connected between the guide bars 51, the end of the screw connecting to the slide bar 48. Accordingly, it will be noted that rotation of the adjusting screw 52 in one direction or the other will cause the adjusting bar 48 to move in or away from the track 25 in accordance with the direction of rotation. Thus the roller means 49, 50 of the second mentioned forming means 45 can be readily adjusted laterally of the track, the adjustment being made depending upon the particular horseshoe size being formed and/or bar thickness of the stock from which the horseshoe is formed.

Figure 12:
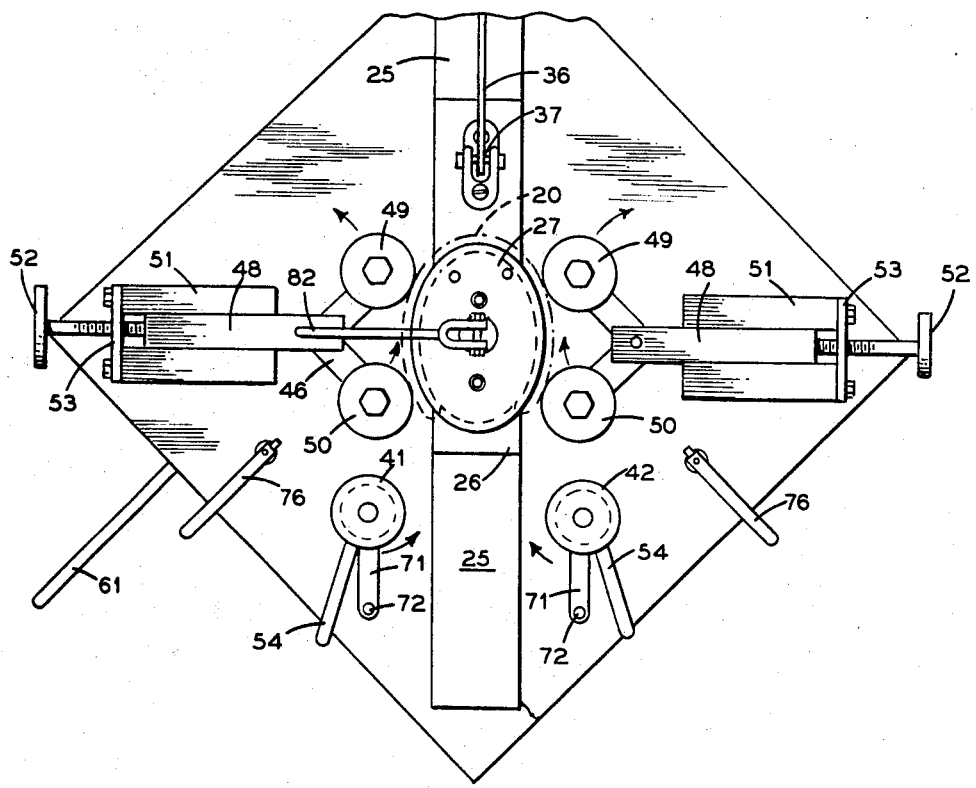
FIGURE 12 is a view similar to that of FIGS. 10 and 11 and illustrating the parts in the final shoe forming position.
Figure 8:
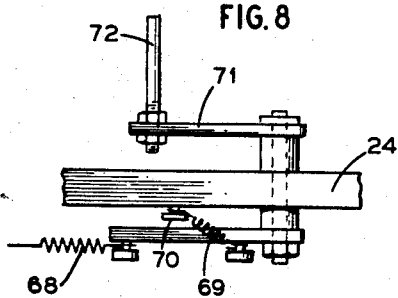
FIGURE 8 is a detail view shown in elevation of one of the aligning means utilized in the apparatus of FIG. 4.
Figure 9:
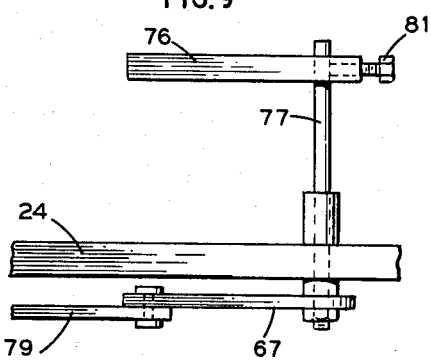
FIGURE 9 illustrates an elevation view of one of the centering means embodied in the structure of FIG. 4.

As it is best seen in FIG. 12, the advancement of the die means 27 beyond the first forming station 38 to the second forming station 39 will cause the roller 49 connected to the bell crank 46 to engage the toe portion of the shoe. As the die of the shoe approaches the forming rollers 49 they are moved outwardly therefrom causing the rollers 50 fixed to the other end of the bell crank 46 to be moved inwardly toward the bending stock and thereby conforming the end portion of the bar stock to the shape of the heel portion of the die. Accordingly, with the forming means 45 of the second station 39 so arranged, it will be noted that the toe portion and the heel portions are automatically and sequentially formed as the die means moves through the second forming station. Thus the horseshoe is completely formed and the die means is returned to its initial starting position upon return of the carriage means.

In order to properly position the bar stock 20 between the fixed rollers 41 of the first forming station 38 and the die means 27, a pair of levers 54—54 are fixedly secured to the frame to define a stock rest. Accordingly, it is to be noted that the stock 20 must be heated to a uniform bright red condition prior to bending or forming the same. Accordingly, the heated stock 20 is disposed on the support rest 54—54 prior to bending the same. Consequently, in order not to lose time in aligning and centering the hot stock on the machine after it has been placed on the stock rest, means are provided for effecting the alingment and centering of the heat bar stock automatically in preparation to bending the same. In accordance with this invention, the centering and alignment means comprises a mechanism which includes a movable center bar 55 mounted for longitudinal movement to the undersurface of the base plate 24. As best seen in FIG. 6, the movable centering bar 55 is mounted for longitudinal movement along the die plate between a pair of guide bars 56—56. A strap means 57 extending between the spaced guide bars 56 supports the movable bar 55 beneath the base member.

As shown, the movable bar 55 is provided with a pair of pins 58 which position therebetween one end 59 of an operating lever 60. The other end 61 of the lever 60 is pivotally connected intermediate the ends thereof about a pivot pin 62. Accordingly, as seen in FIG. 6, movement of the handle portion 61 of the operating lever 60 in the direction of the arrow 63 will cause the centering bar 55 to move in the direction of arrow 64. Movement in the lever 60 in the opposite direction will return the centering bar 55 to its initial set position as shown in FIG. 6.

In accordance with this invention, the aligning means 65 are disposed on each side of the die means 27, each being similarly constructed but opposite in hand. It comprises essentially of a pivot pin 66 which extends through an appropriate opening in the base member 24. Connected to the end of the pivot pin 66 extending beneath the base member is a lever 67. As shown, one end of the lever 67 is connected to the centering bar 55 by means of a tension spring 68. Another tension spring 69 secures the lever 67 to an anchoring pin 70 connected to the base member 24. Connected to the end of the pivot pin 66 extending beyond the base 24 member is a lever 71 which has connected to its free end an upwardly extending pin 72. In operation of the aligning means pin is adapted to engage the bar stock 20 to present the stock 20 substantially normal to the direction of movement of the die means 27 as best seen in FIG. 5. Accordingly, it will be noted that by moving the operating handle 60 in the direction indicated by arrow 63, that the centering bar 55 in moving in the direction of arrow 64, causes the levers 67 to be moved in the direction indicated by arrow 73. Accordingly, the pin 72 connected to lever 71 is rotated causing the aligning pins 72 to move in the direction of arrow 74. This movement causes the bar stock 20 to be wedged between the aligning pins 72 and the periphery of the fixed rollers 41, 42 of the first forming stage 38. In such position, the bar stock 20 is assured of being horizontally disposed or presented normal to the track means.

Centering means 75 cooperatively associated with the aligning means 65 are provided. The centering means 75 are operatively associated to act sequentially with the aligning means in the same operation. As shown, the centering means 75 comprises a pair of levers 76—76 which are pivotally mounted on the base member and they are constructed to engage the end of the bar stock 20 to center the same. In the illustrated form of the invention, and as best seen in FIG. 6, the centering means comprises a pair of pivoting pins 77 which extend upwardly through the plate member 24. The lower end of the pins 77 have fixedly secured thereto a lever arm 78, the respective lever arms 78 being interconnected through a connecting link 79 to the center bar 55. Fixedly connected to the upper end of the pivoting pin 77 which extends beyond the base member is the centering lever 76 the latter being adjustable relative to the pin 77.

Accordingly, it will be noted that because of the difference in linkage, the aligning units 65 will move twice the speed of the centering units 75. It will be noted that after the hot bar stock 20 has been placed on the stock rest 54, it is aligned at a 90° angle with respect to the track 25 and the direction of movement of the carriage, and exactly centered regardless of the stock length by the single movement of the operating handle 60 in the direction 63. Accordingly, as the handle 60, is moved in the direction indicated by the arrow 63, it will exert a pressure against the pins 58 attached to the centering bar 55 and thereby transmits a motion thereto causing it to move in the direction of arrow 64. This bar 55 moves the aligning means 65 and the centering means 75 at different rates of speed. Because of the difference in linkage between the aligning units 65 and the centering units 75, the former will move twice the speed of the latter. Since the aligning means 65 move faster than the centering means 75, the aligning pins 72 force the bar stock 20 against the rollers 41, 42 to first align it at a 90° angle to the track and in the direction of travel of the carrier. Since the aligning units 65 are attached to the centering bar 55 by means of a spring 68, the travel of the centering bar 55 is not hampered, but continues forward bringing the units of the centering means 75 uniformally toward the center of the track. Thus, as the aligning units 65 continue to hold the bar stock 20 against the rollers of the first forming stage, the centering units 75 coming together will tend to center the bar stock relative to the die means. This is rendered possible, because the tie rod 79 arrangement of the centering means is adjusted so as to be equidistant from the centerline and consequently, the centering levers 76 will remain equidistant regardless of the distance they travel.

However, if desired it may be sometimes desired to shape a shoe with one side longer than the other. In such an event, means are provided for de-centering the bar stock the appropriate amount. This can be readily accomplished by loosening the set screw 81 maintaining the centering lever 76 fixed to its pivoting pin, and adjusting the centering lever 76 to the desired off-center position. Retightening the set screw 81 fixes the position of the centering lever 76 with respect to its pivoting pin 77. When the stock 20 has been centered, and the operating handle 60 is released, the tension spring 68 returns the units, that is the aligning units 65 and the centering units 75 to their original position as shown in FIG. 12.

Accordingly, with the stock 20 aligned and centered, the drive unit of the machine (not shown) is now activated to move the carriage 26 and the die means 27 connected thereto longitudinally of the track. As it moves forward along the track, the stock 20 is forced between the upper and lower plates 27A, 27C and against the intermediate die forming plate 27B which is sized to exact inside shape of the horseshoe to be formed. Accordingly, as the dies 27 move forward, the stock is forced between the fixed rollers 41, 42 and assumes a shape indicated in FIG. 10. The continuing forward movement of the partially formed shoe makes contact with rollers 49 of the second stage. As rollers 49 are connected by a bell crank 46 pivoted at 47, the continued forward motion of the die and stock 20 forces roller 49 away from the centerline, while at the same time, forcing the rollers 50 toward the centerline. This causes the end or heel portion of the stock to be pressed against the plate 27B to complete the forming of the horseshoe while conforming to the size of the die plate. The horseshoe thus being complete, the carriage 26, die means 27 and shoe are returned to original start position upon return of the drive shaft 36. Preferably this is done in a continuous motion by having the drive shaft 36 connected to a gear box or an eccentric or the like. Accordingly, the arrangement is such that the machine in making one complete horseshoe being cycle causes the carriage and die to return to their original position where it is ready for use again.

As the complete horseshoe is a substantial elliptical shape and therefore bent considerably more than 180°, it is necessary for the die means 27 to separate into their component parts in order to effect the removal or release of the horseshoe therefrom. Accordingly, by rotating the eccentric 35 to the position illustrated in FIG. 7A, the upper and lower plates of the die means can be readily separated to effect removal of the horseshoe therefrom.

Accordingly, the cam eccentric provides an immediate direct adjustment by which sufficient pressure can be brought to bear upon the upper portion of the die to maintain the die as a firm single unit while the machine is in operation. When the horseshoe has been removed, the upper portion of the die can be simply reset by reversing the handle 82 of the eccentric to ready it for use again.

Since horseshoes are made in various sizes and from stock of varying thicknesses, the apparatus described is provided with all the necessary adjustment to accommodate for these variables. Accordingly, the intermediate plate 27B of the die means 27 which is the exact size and shape of the die to be formed, can be readily interchanged for other sizes. The upper and lower plates 27A, 27C of the die means are also made in pairs which are alike in size and shape, except that the lower plate is provided with an enlarged central hole to accommodate the passage of the compression spring. The upper and lower plates keep the stock level end flat while it is being shaped around die plate. For this reason, the upper and lower plates are generally larger than the die plate by slightly less than the width of the bar stock being shaped. This allows the rollers to make contact with the material being shaped. Consequently, in order to maintain this proportional relationship between the center die plate 27B and the top and bottom plates 27A, 27C, the pair of plates 27A, 27C are sized to accommodate the varying sizes of the die plate.

Rollers 49, 50 which complete the forming of the shoe are rendered adjustable according to the size of the die means being used. This is effected by connecting the rollers to adjustable slides 48 which are laterally adjusted as hereinbefore described. Thus, the adjusting slide 48 moving between appropriate guides is held in its adjusted position by means of a set screw 52.

Generally, the length of stock from which horseshoes are formed may vary from between 8" to 14" and by making the described adjustments, any length can be accommodated on the apparatus described. The only other variable which is possible is that all stock is not of the same thickness. Consequently, the only other adjustment necessary to accommodate varying thicknesses is a shim or shims placed between the lower die plate and the die plate to allow for sufficient clearances between the upper and lower plates to accommodate variable bar thicknesses.

By utilizing a machine herein described in the manner indicated, an operator can consistently turn out horseshoes at a rate of approximately 1 every 30 seconds after only very little practice. Accordingly, this compares very favorably with the fact that otherwise it would take a blacksmith, with years of experience, at least 5 minutes to do the same work by hand. In addition to this, the shoes produced by hand are not uniform due to the variations of the hammer marks required to manually form the same whereas in the instant invention, shoes produced on the machine are perfectly uniform in every respect.

While the instant invention has been described with reference to a particular embodiment thereof, it will be readily appreciated and understood that variations and modifications may be made without departing from the spirit or scope of the invention.

What is claimed is:

1. An apparatus for shaping bar stock of predetermined length into horseshoes comprising
   a base member,
   a track means connected to said base,
   a die means movably mounted on said base,
   a drive means operatively connected to said die means for advancing the same along said track,
   forming means mounted on either side of said track means to form a bar stock about said die means to shape the same accordingly,
   means for mounting and centering said bar stock relative to said die means, said die means comprising,
      a carriage movably mounted on said track, and
      a horseshoe-shaped die mounted on said carriage for movement therewith,
      said die comprising a pair of upper and lower members, and
      a die plate interposed therebetween,
      said die plate being shaped to the shoe size to be formed from said stock,
      and means for readily clamping and unclamping said die plate between said upper and lower die members between operative and unoperative position.

2. The invention as defined in claim 1 wherein said die plate is detachable secured to one of said other die members and rendered movable therewith between open and closed positions.

3. The invention as defined in claim 2 wherein the means for clamping and unclamping said die members includes,
   (a) a stud connected to said carriage,
   (b) each of said die members and die plate having aligned openings to receive said stud,
   (c) a spring disposed about said stud for normally biasing said upper member away from said base member,
   (d) and a cam means connected to said stud to exert a force on said upper member to overcome the bias of said spring to maintain said die members in the operative clamped position thereof.

4. The invention as defined in claim 1 wherein said forming means comprises,
   (a) a pair of fixed rollers, one mounted on either side of said track means so that the movement of said die means between said fixed rollers causes said bar stock to be bent about said die means.

5. An apparatus for shaping bar stock of predetermined length into horseshoes comprising,
   a base member,
   a track means connected to said base,
   a die means movably mounted on said base,
   a drive means operatively connected to said die means for advancing the same along said track means,
   forming means mounted on either side of said track means to form a bar stock about said die means to shape the same accordingly,
   means for mounting and centering said bar stock relative to said die means,
   said forming means including a pair of fixed rollers, one mounted on either side of said track means so that the movement of said die means between said fixed rollers causes said bar stock to be bent about said die means, said forming means includes,
- another set of rollers, two disposed on either side of said track means and spaced from said fixed rollers in the direction of movement of said die means,
- each two of said set of rollers including a bell crank pivotally mounted on said base member at the apex of said cranks,
- a roller connected to each end of said bell crank for sequentially bending said stock about said die means to finish shaping the same into a horseshoe as said die means moves along said track means therebetween.

6. An apparatus for shaping bar stock of predetermined length into horseshoes comprising,
- a base member,
- a track means connected to said base,
- a die means movably mounted on said base,
- a drive means operatively connected to said die means for advancing same along said track means,
- forming means mounted on either side of said track means to form a bar stock about said die means to shape the same accordingly,
- means for mounting and centering said bar stock relative to said die means, and said mounting and centering means includes,
  - a centering bar mounted for movement to said base plate,
  - an aligning means disposed on each side of said die means to align said stock normal to the direction of travel of said die means,
  - each of said aligning means including a lever pivotally mounted on said base member,
  - pin connected to said lever to engage said stock,
  - means for connecting said lever to said centering bar so that said lever pivots in the direction of movement of said die means whereby said pins connected thereto engages the stock to insure it is disposed normal to the direction of movement of said die means,
  - and a centering device to center said stock relative to the movement of said die means.

7. The invention as defined in claim 6 wherein,
  (a) said centering means including centering levers pivotally mounted on said base member,
  (b) means connecting each of said centering levers to said centering bar whereby movement of said centering bar effects movement of said centering levers to engage the ends of said stock to position the same relative to the line of travel of said die means.

8. The invention as defined in claim 7 and including an operating means operatively connected to said centering bar whereby said aligning levers are brought into operatime position prior to that of the centering levers.

9. An apparatus for shaping bar stock of predetermined lengths into horseshoes comprising,
  (a) a base member,
  (b) a track mounted on said base member,
  (c) a carriage mounted for movement along said track,
  (d) a die means mounted on said carriage to be carried therealong,
  (e) said die means including superimposed plate members including a die plate and upper and lower plate to sandwich said die plate therebetween,
  (f) means for rendering said die plate interchangeable,
  (g) means for effecting the clamping and unclamping of said die plates between operative and inoperative position,
  (h) a plurality of forming stations spaced along said track,
  (i) one of said forming stations including a pair of fixedly journalled rollers, one disposed to each side of said track,
  (j) and another of said forming stations including adjustably disposed roller units disposed on each side of said track,
  (k) each of said roller units including a bell crank pivotally mounted intermediate the ends thereof,
  (l) a forming roller connected to each of said crank,
  (m) means for effecting lateral adjustment of said roller unit toward and away from said track,
  (n) and means for aligning a bar stock normal to the direction of travel of said carriage and die means,
  (o) and means for centering said stock relative to said die means.

References Cited

UNITED STATES PATENTS

| 417,960 | 12/1889 | Wheeler | 59—53 |
| 494,166 | 3/1893 | Roberts | 59—53 |
| 939,901 | 11/1909 | Freuler | 59—56 |

CHARLES W. LANHAM, *Primary Examiner.*

G. P. CROSBY, *Assistant Examiner.*